United States Patent
Handschuh et al.

(10) Patent No.: US 9,919,469 B2
(45) Date of Patent: *Mar. 20, 2018

(54) BLOW MOULDING MACHINE WITH A PNEUMATICALLY OPERATED BLOW AIR VALVE AND A METHOD FOR OPERATING SUCH A BLOW MOULDING MACHINE

(71) Applicant: KRONES AG, Neutraubling (DE)

(72) Inventors: Eduard Handschuh, Donaustauf (DE); Florian Geltinger, Donaustauf (DE); Frank Winzinger, Regensburg (DE)

(73) Assignee: KRONES AG (DE)

( * ) Notice: Subject to any disclaimer, the term of this patent is extended or adjusted under 35 U.S.C. 154(b) by 720 days.

This patent is subject to a terminal disclaimer.

(21) Appl. No.: 14/486,699

(22) Filed: Sep. 15, 2014

(65) Prior Publication Data
US 2015/0076746 A1 Mar. 19, 2015

(30) Foreign Application Priority Data
Sep. 13, 2013 (DE) .................. 10 2013 110 088

(51) Int. Cl.
*B29C 49/42* (2006.01)
*B29C 49/58* (2006.01)
(Continued)

(52) U.S. Cl.
CPC .......... *B29C 49/4289* (2013.01); *B29C 49/28* (2013.01); *B29C 49/42* (2013.01);
(Continued)

(58) Field of Classification Search
None
See application file for complete search history.

(56) References Cited

U.S. PATENT DOCUMENTS 5,501,253 A    3/1996  Weiss ............................. 141/40
8,708,690 B2 * 4/2014  Knott .................... F16K 41/103
                                                          251/331
(Continued)

FOREIGN PATENT DOCUMENTS

| CN | 102588660 | 7/2012  | ............. B29C 49/42 |
| EP | 1862230   | 12/2007 | ............... B08B 9/34 |
| EP | 2474763   | 7/2012  | ........... F16K 31/122 |

OTHER PUBLICATIONS

Chinese Office Action issued in application No. 201410468632.0, dated Jun. 3, 2016 (13 pgs).
(Continued)

*Primary Examiner* — Monica Huson
(74) *Attorney, Agent, or Firm* — Hayes Soloway P.C.

(57) ABSTRACT

An apparatus for molding plastic preforms into plastic containers, includes an application unit for applying a gaseous medium onto the plastic performs. The application unit includes at least one valve unit for controlling the gaseous medium to be supplied to the plastic preform. The valve unit has a working piston that is movable between at least two positions, and a control piston that is movable between at least two positions. Movement of the control piston is coupled, at least at times, to movement of the working piston. The valve unit includes a sealing unit that substantially prevents a gas flow between the working chamber and the control chamber at least in one position of the working piston and a membrane body that seals at least one area of the control piston against at least one area of the control chamber.

12 Claims, 4 Drawing Sheets

(51) Int. Cl.
*B29C 49/28* (2006.01)
*F16K 3/24* (2006.01)
*F16K 31/163* (2006.01)
*B29C 49/06* (2006.01)
*B29C 49/12* (2006.01)
*B29C 49/36* (2006.01)
*B29C 49/46* (2006.01)
*B29K 105/00* (2006.01)
*B29L 31/00* (2006.01)

(52) U.S. Cl.
CPC ............... *B29C 49/58* (2013.01); *F16K 3/24* (2013.01); *F16K 31/163* (2013.01); *B29C 49/06* (2013.01); *B29C 49/12* (2013.01); *B29C 49/36* (2013.01); *B29C 49/46* (2013.01); *B29C 2049/4294* (2013.01); *B29C 2049/4635* (2013.01); *B29C 2049/4697* (2013.01); *B29C 2049/5803* (2013.01); *B29K 2105/258* (2013.01); *B29L 2031/712* (2013.01)

(56) References Cited

U.S. PATENT DOCUMENTS

| | | | |
|---|---|---|---|
| 9,403,330 B2* | 8/2016 | Laumer | B29C 49/4205 |
| 2012/0177770 A1 | 7/2012 | Knott et al. | 425/524 |
| 2012/0201918 A1 | 8/2012 | Elbs | 425/149 |
| 2012/0225157 A1 | 9/2012 | Geltinger et al. | 425/535 |
| 2015/0097306 A1* | 4/2015 | Finger | B29C 49/60 |
| | | | 264/40.3 |

OTHER PUBLICATIONS

Extended European Search Report (no translation) issued in application No. 14184710.3, dated Feb. 11, 2015 (4 pgs).
Extended European Search Report (no translation) issued in application No. 14184710.3, dated Nov. 16, 2015 (7 pgs).

\* cited by examiner

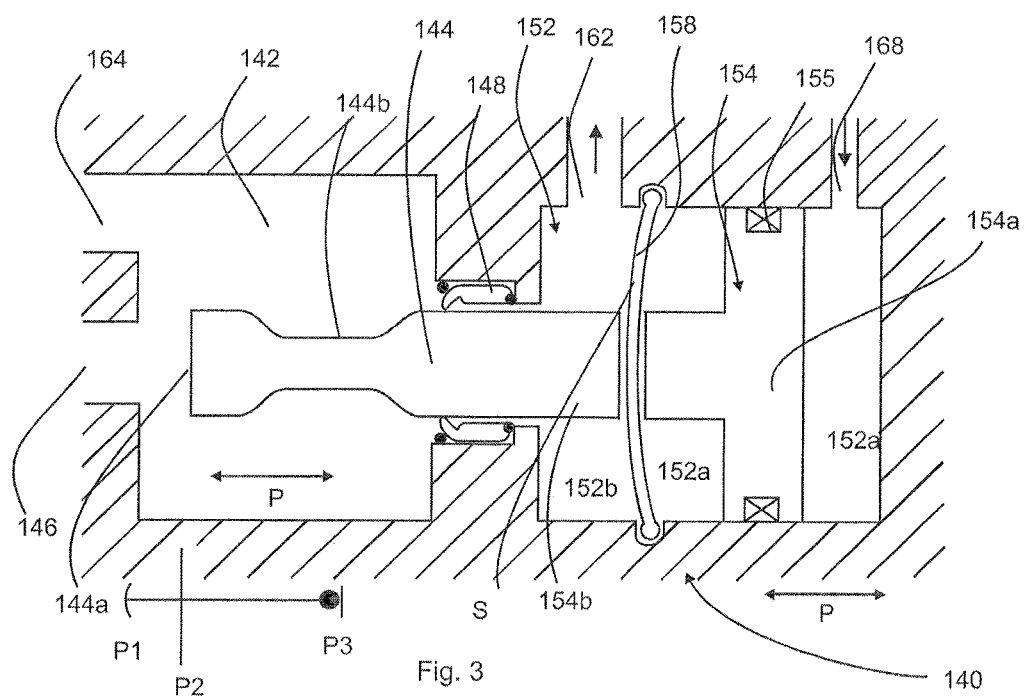
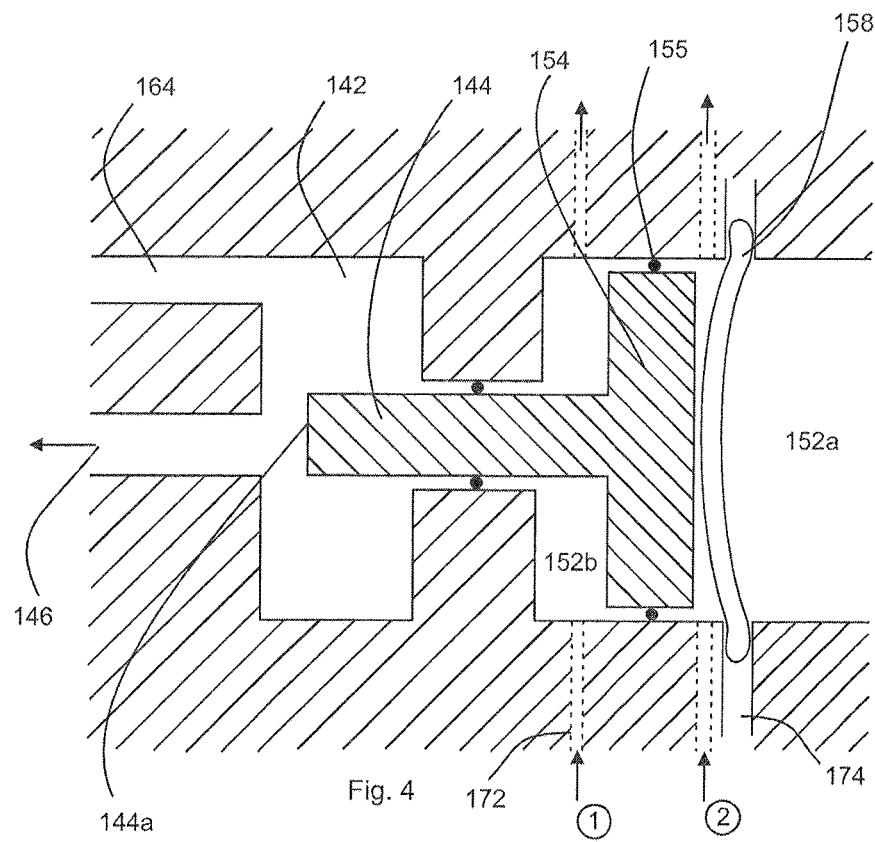

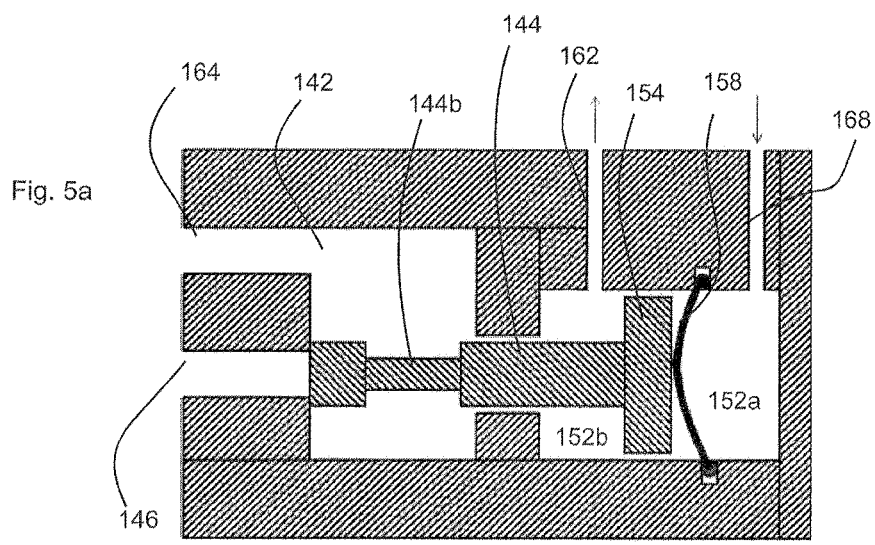
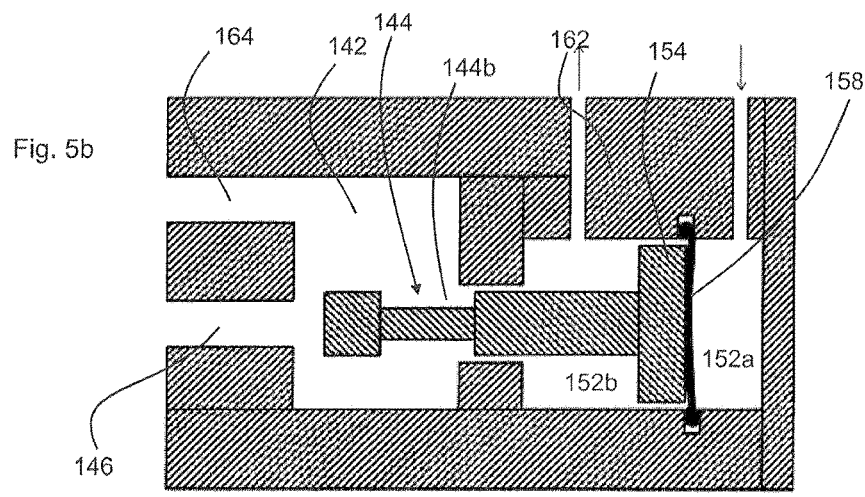
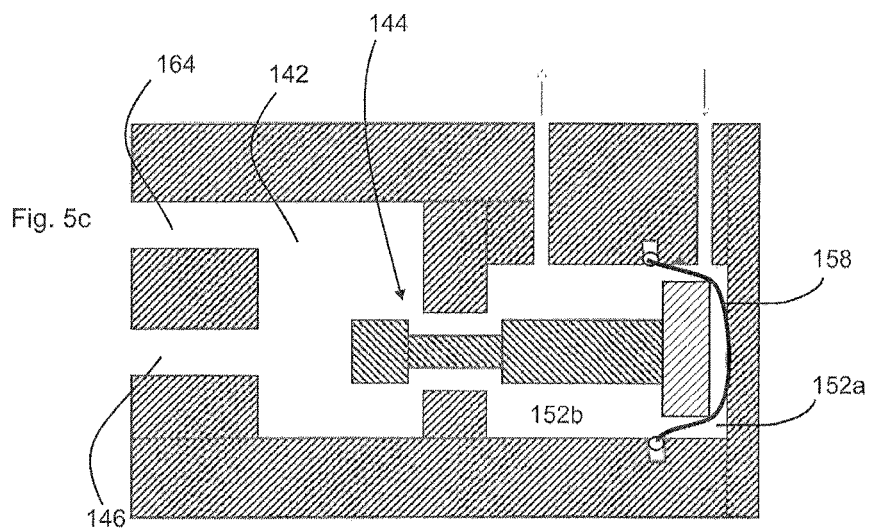

BLOW MOULDING MACHINE WITH A PNEUMATICALLY OPERATED BLOW AIR VALVE AND A METHOD FOR OPERATING SUCH A BLOW MOULDING MACHINE

The present invention relates to an apparatus for moulding plastic preforms into plastic containers. Such apparatus have been known from the prior art for a long time. In this context, preheated plastic preforms are usually moulded or expanded into the plastic containers within blow moulds by way of applying blow pressure. To this end, a blow nozzle is presented to a mouth of the plastic preforms, which blow nozzle applies a gaseous medium onto the plastic preforms, for example blow air or sterile air. It is necessary for the production or bottling of certain beverages to introduce such beverages into sterilised containers. For this purpose, the already finished, for example blow moulded containers are usually sterilised using sterilisation agents.

However, in recent times there has been a tendency towards carrying out the manufacture of these plastic containers, for example the blow moulding process, in a sterile manner. This means that not conventional blow air but sterile air is used for expanding the plastic preforms. In this connection, the blow air valves that control this air supply are, in any case if they are pneumatically operated valves, relatively problematic because their operation is also ensured by means of control air, and this control air in turn could prevent a sterile blow moulding process.

The present invention is therefore based on the object of improving in particular also the control of the blow air for such blow moulding processes, in particular also in the light of sterile applications.

According to the invention, this object is achieved by the subject matters of the independent claims. Advantageous embodiments and developments are the subject matter of the dependent claims.

The apparatus for moulding plastic preforms into plastic containers according to the invention has at least one moulding unit, which in turn includes a blow moulding unit that forms a cavity, within which the plastic preforms can be moulded into plastic containers by applying a gaseous medium thereto. Further, the moulding unit includes an application unit which applies a gaseous medium onto the plastic preforms via the mouth thereof. In this respect, this application unit includes at least one valve unit that is used for controlling the gaseous medium to be supplied to the plastic preform.

This valve unit includes a working chamber to which a gaseous medium can be applied, in particular the gaseous medium that is also used for expanding the plastic preforms. Apart from that, the valve unit has an opening, via which the gaseous medium can be supplied from the working space to the plastic preforms (or can be discharged from the plastic containers). Further, the valve unit has a working piston that is movable within this working chamber between at least two positions, wherein in the first position of this working piston, the gaseous medium can flow via the opening, and wherein in a second position of the working piston, a flow of the gaseous medium through the opening is prevented. Apart from the term working chamber, also the term working space will be used at times.

Further, the valve unit has a control piston that is movable within a control chamber between at least two positions, wherein a movement of this control piston is coupled, at least at times, to a movement of the working piston. Further, the control chamber includes an opening for supplying and/or discharging (generally for passing) a control medium and in particular a gaseous control medium.

According to the invention, the valve unit includes a sealing unit that substantially prevents, in at least one position of the working piston, a gas flow between the working chamber and the control chamber. Further, the valve unit includes a membrane body that seals at least an area of the control piston against an area of the control chamber, wherein the control unit is disposed between the membrane body and at least one section of the working piston (and in particular at least a surface of the working piston that is used for closing the opening).

It is therefore proposed to separate an area of the control chamber and in particular of the control space, to which control air for controlling the valve can be applied, against further areas of the valve and in particular also against the working space, through which the gas used for expanding the plastic preforms is passed. In this way it is possible to use conventional air, in particular non-sterile air, as control air, and at the same time a sterile blow process is made possible.

In particular, the above-mentioned section of the working piston is a section which is also intended and able to seal said opening, through which the blow air can get into the plastic preform.

In a preferred embodiment, the moulding unit is disposed on a movable carrier. This movable carrier may in particular be a blow wheel. Preferably, a plurality of moulding units is arranged on this movable carrier and in particular on said blow wheel. In this connection, the above-mentioned blow moulding units advantageously each include lateral parts that are movable or pivotable relative to each other, which parts form a cavity, within which the plastic preforms are expanded into plastic containers. In a further advantageous embodiment, the application unit includes a blow nozzle that can be applied to a mouth of the plastic preform, in order to apply blow air onto it in this way. Thus, the application unit is advantageously, at least at times, in flow communication with the valve unit.

In a further advantageous embodiment, the moulding unit includes a rod-like body that can be inserted into the plastic preforms for the stretching thereof. This rod-like body is in particular a so-called stretch rod.

In a further advantageous embodiment, the moulding unit is a clean room, within which the plastic preforms are transported during the expansion thereof. Advantageously here, also at least components of the moulding units are introduced into this clean room. In particular, the blow moulding units are guided or transported within this clean room. In this context, the apparatus includes at least one and preferably a plurality of walls which seal the clean room against the surroundings. In this context it is possible for a wall of this clean room to be movably arranged relative to a further wall of this clean room. Further, advantageously, at least one sealing unit is provided, which seals the movement of this one wall against another wall.

This sealing unit is particularly preferably a so-called surge chamber. This surge chamber has here a circumferential channel that is filled with a liquid, into which channel a part of the further wall is submerged, so that sealing is achieved.

Advantageously, said stretch rod is guided within the above-mentioned blow nozzle.

In a further advantageous embodiment, the working chamber has a further opening, in order to supply blow air to the working chamber. This blow air may here come for example from a reservoir, in particular a pressurised air reservoir. This reservoir may for example be a ring channel.

In a further advantageous embodiment, the working piston is displaceable between two positions and is in particular displaceable by way of a linear movement. In a further advantageous embodiment, the membrane body is made from an elastic material. The above-mentioned sealing unit is in particular a sliding gasket.

In a further advantageous embodiment, pressures of up to 60 bar, preferably up to at least 50 bar can be applied to the working space or the working chamber. The gaseous medium is in particular sterile air.

In a further advantageous embodiment, a plurality of valve units of the above-described type is present. In this context it is possible to apply different pressures in succession onto the plastic preforms by means of this plurality of valve units. Thus, for example, initially a pre-blow pressure, subsequently an intermediate blow pressure and finally a finish blow pressure can be applied to the plastic, wherein the pressure levels preferably increase from the pre-blow pressure up to the finish blow pressure. Advantageously here, a plurality of the above-described valves is used. Preferably, the apparatus also includes a plurality of reservoirs in order to supply the blow air to the plastic preforms and/or in order to store the blow air. Preferably, these reservoirs are formed as ring channels which supply a plurality of moulding stations with the blow air. Further, also a valve unit may be provided which controls the outlet of a gaseous medium from the plastic containers, for example the outlet following a completed blow moulding process.

In a further advantageous embodiment, the membrane body is provided in the control chamber. Here, the membrane body can delimit this control chamber or a control space, to which control air is applied. The control chamber or the control space has here an internal volume that varies, preferably as a function of a position of the control piston. Advantageously, this internal volume is changed by way of a movement of the membrane body. The membrane body is therefore advantageously provided between the control piston and the control air space. Preferably, the movement of the control piston is permanently coupled to that of the working piston. It would also be possible here for the working piston and the control piston to be integrally formed, which means in one piece. This means that here the control piston is at the same time also the working piston, however, in particular in the longitudinal direction thereof, different sections may fulfil the function of the working piston and the function of the control piston. Thus, the section of the entire assembly that is located or moves in the working chamber can be regarded as the working piston, and the section that is located or moves in the control chamber can be regarded as the control piston. In particular, that section is understood to be the working chamber that will always be in the working chamber irrespective of the position of the valve during working operation, and that section will be regarded as the control piston that will always be in the control chamber, irrespective of the position of the valve in the working operation.

Preferably, therefore, a unit of the control and the working piston will not be interrupted by the membrane body.

In a further advantageous embodiment, the sealing unit substantially prevents a gas flow between the working chamber and the control chamber in the first and/or second position or in a first and/or further position of the working piston. The word "substantially" is here understood to mean that this gas flow may be completely prevented, but that under certain circumstances minor gas flows may occur, although this is not intended. Advantageously, the control chamber is subdivided by the membrane body into two spatial parts which are also separated from each other by the membrane body. The first spatial part is here the above-mentioned control space, to which control air is applied. The second space is located between this control space and the mentioned sealing unit and is enlarged or reduced as a function of the position of the control piston relative to the control space. It would also be conceivable if the gas flow between the working chamber and the control chamber is prevented only in one position and in particular in a closed position of the valve unit.

Preferably, in both of the above-mentioned positions, which means both in the first and in the second position, a flow in the direction of the control chamber is substantially prevented by the sealing unit. In this way it can be prevented that during the working operation, sterile air escapes from the working chamber in the direction of the control chamber.

Advantageously, however, the internal pressure in the working chamber will always be higher than in the control chamber. In this way, it can be prevented that contaminated air can get into the working chamber.

In a further advantageous embodiment, the valve unit includes a supply and/or a discharge opening for supplying and/or discharging a cleaning agent. This can in particular be a cleaning agent that is used for cleaning the working space. Advantageously here, this supply and/or discharge opening is provided between the sealing unit and the membrane body. In a further advantageous embodiment, said supply opening and/or discharge opening is provided in an area of the control chamber, however advantageously not in the area of the control space but in the area of the control chamber that is separated by the membrane body.

In a further advantageous embodiment, the sealing unit surrounds a section of the working piston in the circumferential direction thereof. In other words, said section of the working piston is passed through the sealing unit. Thus, the sealing unit may for example surround the working or control piston in a transitional section that connects the part that serves as the control piston to the part that serves as the working piston. In the context of the present invention, a piston is in particular understood to mean an element that is movable in an axial or straight direction relative to a defined space.

In a further advantageous embodiment, the membrane body rests against a surface of the control piston. Advantageously, the membrane body rests on a surface of the control piston at least in certain positions of the control piston.

In a preferred embodiment, this surface of the control piston is designed to be curved, so that one-sided and elevated loads on the membrane body can be avoided. It would however also be possible for the membrane body to be fixed to the control piston in a pointwise manner.

Advantageously, the working and/or control piston can also be transferred to a third position, in which a medium can flow from the working space or the working chamber into the control chamber or in the opposite direction. In the third position, the piston is mounted in such a way that the taper 144b is located at the level of the sealing 148, as a result of which a flow connection can be created between the working chamber and the control chamber. However, this third position is not traveled to in particular in the context of a working operation, but only in the context of a cleaning operation, in which it is intended that a cleaning agent passes from the working space to the control chamber. This cleaning agent can be discharged via the above-mentioned opening. The cleaning agent is preferably a liquid and/or a gaseous medium. The cleaning agent can in particular be supplied through an opening below a membrane body.

A cleaning agent is also understood to be a sterilisation agent that is or contains in particular gaseous hydrogen peroxide and/or peracetic acid.

To this end, for example the working or control piston may include a section tapering or tapered in a radial direction, so that a distance between an external surface of the working or control piston and the above-mentioned control unit is created. Through this distance in turn, a cleaning agent may flow. Advantageously, this tapered section is formed in a circumferential direction of this piston.

In particular, the apparatus includes a plurality of moulding stations. On or on top of each moulding station, in particular a valve block is provided, on or in which at least two, preferably at least three, valve units are provided.

The at least two valve units are in particular associated with different functions—thus, by switching a first valve unit, a pre-blow medium, for example with a pressure of 4 to 30 bar, can be introduced, and a medium for finish moulding the hollow body can be introduced with a second pressure of for example 10 to 40 bar. Each valve is here preferably connected to a so-called ring channel that is used as a distributor for the pressurised air to the plurality of blow stations. In order to provide different pressures, in particular two ring channels are provided, within which the medium is distributed amongst the pressures just mentioned. The first ring channel is here connected to a plurality of first valves on the moulding stations, the second one is connected to a plurality of second valves.

During a sterilisation operation, the sterilisation medium flows via the ring channels to the valve units and from there into the interior of the cleaning space or to further valve units.

In a further advantageous embodiment, at least two, preferably at least three, valve units are provided in or on a valve block that is preferably provided on a moulding station. Preferably, at least one of these valve units, preferably a plurality of valve units and particularly preferably all of these valve units are a valve unit of the type mentioned above.

The present invention is further directed to a pneumatically controlled valve unit for controlling a media supply to a container. In this context, this valve unit includes a working chamber to which a flowable medium can be applied, as well as an opening, through which the flowable medium can be supplied from the working chamber or a working space of the working chamber to the containers. Further, the valve unit includes a working piston that is movable within this working chamber between at least two positions, wherein in a first position of this working chamber, the flowable medium can flow via the opening, and wherein in a second position (a closing position) of the working chamber opposite the working space, a flow of the flowable medium through said opening is prevented.

Further, the valve unit includes a control piston that is movable within a control chamber between at least two positions, wherein a movement of the control piston is coupled, at least at times, to a movement of the working piston, and wherein the control chamber has an opening for supplying a gaseous control medium.

According to the invention, the valve unit includes a sealing unit that substantially prevents a gas flow between the working chamber and the control chamber in the first and the second position of the working chamber, and the valve unit further includes a membrane body that seals at least one area of the control piston relative to at least one area of the control chamber, wherein the sealing unit is provided between the membrane body and at least one section of the working piston, and wherein the membrane body delimits a control space of the control chamber, to which the gaseous control medium can be applied.

Preferably, said valve unit is used for blow moulding machines and in particular for sterile blow moulding machines. However, in general it would also be conceivable to use the valve unit described here in other areas, for example for sterile filling machines. In this case, the flowable medium would be a liquid, however it would also be possible for the flowable medium to be a gaseous medium, for example a sterile medium to be applied to a head space of the containers. Further, such a valve unit can also be used for sterilisation units, for example for units that blow containers out with sterile air. Apart from that, also the use for purging units and the like would be conceivable. The applicant reserves the right to claim protection for such applications of the valve units described here.

It would also be possible for the valve unit to be a hydraulically actuatable valve unit, so that a liquid medium instead of a gaseous medium is applied to the control space.

The present invention is further directed to a method for moulding plastic preforms into plastic containers. In this context, the plastic preforms are transported along a specified transport path and are moulded during this transport by applying a gaseous medium to the plastic containers. In the course of this, a sterile gaseous medium is supplied to the plastic preforms and the supply of the gaseous medium is controlled by at least one valve unit, wherein this valve unit is a valve unit that is controlled by a further gaseous medium and has a working space to which the gaseous medium can be applied.

According to the invention, the further gaseous medium is a non-sterile medium, and this further gaseous medium is applied to a control space for moving a control piston, and this control space is delimited by a flexible membrane body.

Preferably, the working space is delimited by a sealing unit that is movable relative to the working piston.

Preferably, the working medium is supplied at a pressure of less than 50 bar, preferably less than 40 bar, but more than 8 bar, particularly preferably less than 35 bar and more than 25 bar.

In a further preferred method, the plastic preforms are stretched, at least at times, during the expansion thereof by means of a rod-like body and a stretching rod.

Further advantages and embodiments will become evident from the attached drawings, wherein:

FIG. 3 shows a view of a valve unit according to the invention;

FIG. 4 shows a view of a valve unit according to the invention in a further embodiment;

FIG. 5a-5c show three views of a valve unit in different working positions; and

Figure 1:
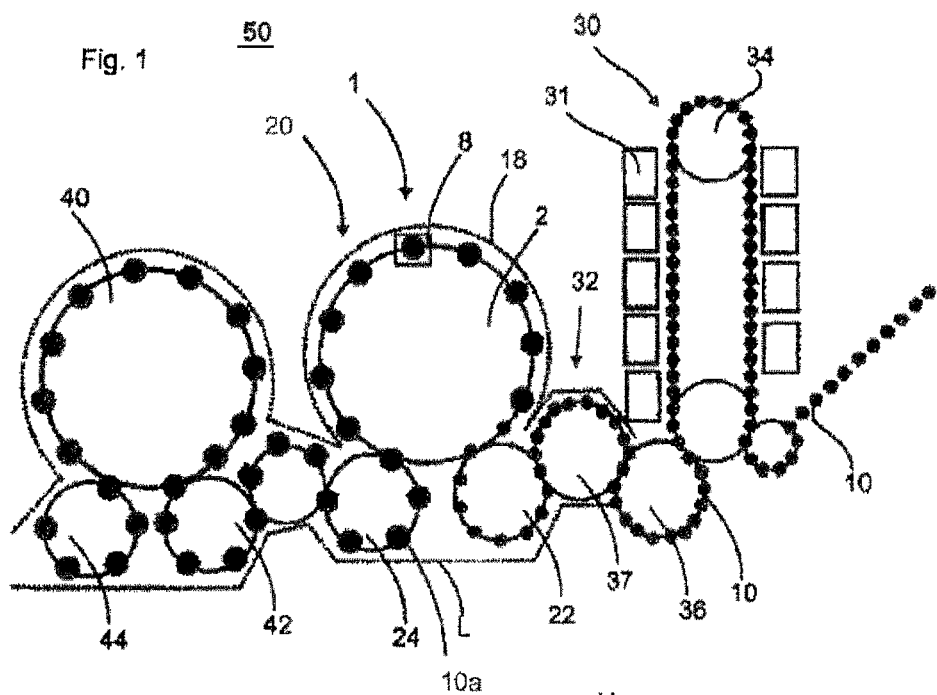
FIG. 1 shows a highly schematic view of an apparatus for moulding plastic preforms into plastic containers.

FIG. 1 shows a schematic view of a system for producing plastic containers. This system 50 comprises a heating unit 30, in which plastic preforms 10 are heated. In the course of this, these plastic preforms 10 are conveyed by means of a transport unit 34, here a revolving chain, through this heating unit 30 and are heated by a plurality of heating elements 31. This heating unit 30 is followed by a transfer unit 36 that transfers the preforms 10 to a sterilisation unit 32. This sterilisation unit 32 has here also a transport wheel 37 and sterilisation elements may be provided on this transport wheel 37 or in a stationary manner. In this area, for example, sterilisation by hydrogen peroxide gas or by electromagnetic radiation is possible. In particular, interior sterilisation of the preforms is carried out in this area.

Reference numeral 20 identifies in its entirety a clean room, the external boundaries of which are here indicated by a dotted line L. In a further preferred embodiment, the clean room 20 is not only provided in the area of the transport wheel 2 and the bottling unit 40, but may begin as early as in the area of the heating unit 30, of the sterilisation unit 32, of the plastic preform supply and/or of the plastic preform production. It can be seen that this clean room 20 starts in the area of the sterilisation unit 32. In this area, sluice units may be provided in order to introduce the plastic preforms into the clean room 29, without too much gas flowing within the clean room where it will then get lost.

The clean room, as indicated by the dotted line L, is adapted to the outer shape of the individual system components. In this way, the volume of the clean room can be reduced.

Reference numeral 1 designates in its entirety a moulding apparatus, wherein a plurality of blow stations or moulding stations 8 is provided on a transport wheel 2, with only one of these blow stations 8 being shown here. These blow stations 8 are used to expand the plastic preforms 10 into containers 10a. Although not shown in detail here, not the entire area of the transport unit 2 is located within the clean room 20, but the clean room 20 or the isolator is realised, to a certain extent, as a mini isolator within the entire apparatus. It would thus be possible for the clean room to be implemented in a channel-type way at least in the area of the moulding apparatus 1.

Reference numeral 22 relates to a supply unit that transfers the preforms to the moulding unit 1, and reference numeral 24 relates to a discharge unit that discharges the produced plastic containers 20 from the moulding apparatus 1. It can be seen that the clean room 20 includes recesses both in the area of the supply unit 22 and of the discharge unit 24, which recesses receive these units 22, 24. This enables, in a particularly advantageous manner, a transfer of the plastic preforms 10 to the moulding apparatus 1 or a take-over of the plastic containers 10a from the moulding apparatus 1 to be achieved.

A transfer unit 42 is used to transfer the expanded plastic containers to a bottling unit 40 and to subsequently discharge them from this bottling unit 40 to a further transport unit 44. In the course of this, also the bottling unit 40 is located within said clean room 20. In the case of the bottling unit, too, it would be possible if not the entire bottling unit 40 is located within the clean room 20, for example with a reservoir for a beverage, but here, too, just those areas in which the containers are actually guided. In so far, also the bottling unit could be designed in a manner similar to the apparatus 1 for forming plastic preforms 10.

As mentioned, in the area of the apparatus 1, the clean room 20 is reduced to an area as small as possible, namely substantially to the blow stations 8 themselves. As a result of this compact design of the clean room 20, a clean room can be produced more easily and more quickly, and maintaining sterility during the operation phase is less complex. Also, less sterile air is needed, which leads to smaller filter systems, and also the risk of any uncontrolled vortex formation is reduced.

Figure 2:
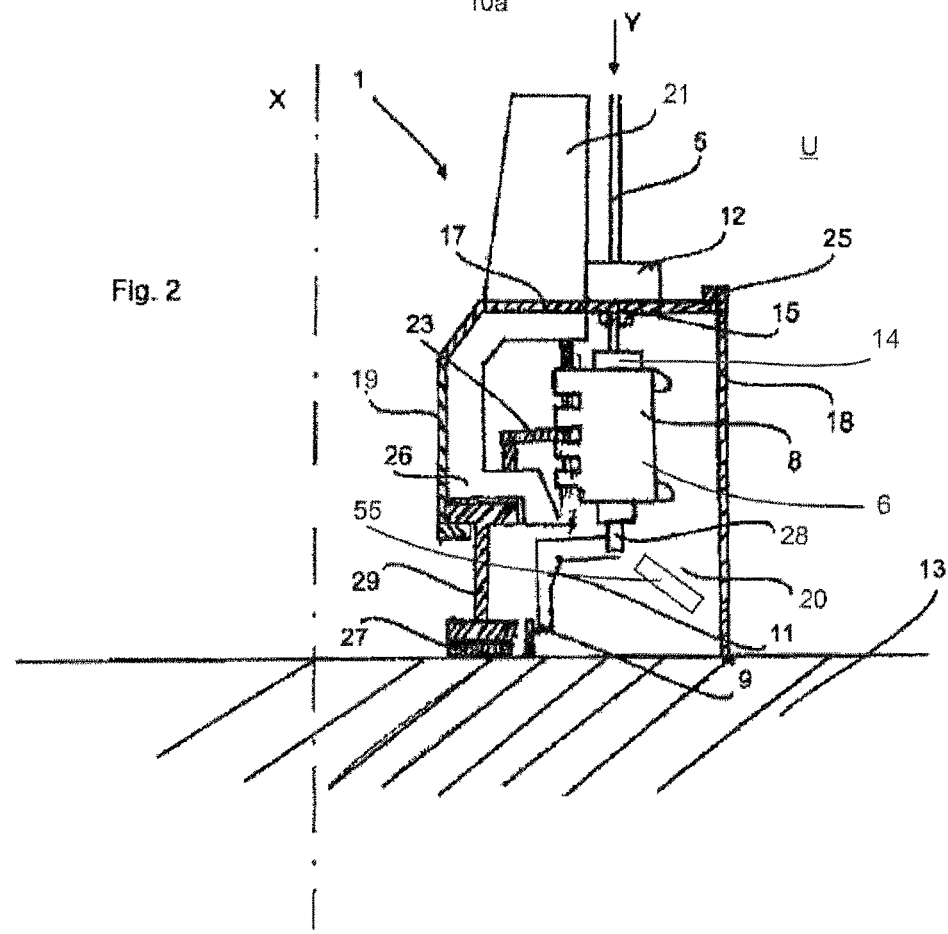
FIG. 2 shows a further view of a moulding unit.

FIG. 2 shows a detailed view of the apparatus 1 in the area of a blow station 8. A plurality of such blow stations 8 is moved in a rotary manner about an axis X by a transport unit 2 or a carrier. The blow station 8 is guided, as can be seen in FIG. 2, within the clean room 20, which is formed here in a channel-type manner. This clean room 20 is terminated by a movable lateral wall 19 and a cover 17 that is integrally moulded with this lateral wall 19. This lateral wall 19 and the cover 17 rotate together with the blow station 8.

Reference numeral 18 relates to a further wall that delimits the clean room 20. This wall 18 is here an external wall that is arranged to be stationary. Between the cover 17 and the wall 18, a sealing unit 25 is provided which seals the elements 17 and 18 movable relative to each other against one another, for example, as mentioned above, by means of a surge chamber. The bottom area of the wall 18 is provided on a floor 13 in a fixed and sealing manner. Within the clean room 20 and here resting directly against the wall 19, a carrier 26 is provided, which also moves in a rotary manner and on which in turn holding means 23 are provided, which hold the blow station 8.

Reference numeral 11 relates to a follower unit that can be actuated by a guide cam 9, in order to open and close the blow station on its way through the clean room 20, in particular in order to insert the plastic preform into the blow station and also to remove it again therefrom. A guiding cam 9 is also provided within the clean room 20. However, it would for example also be possible to already guide a section 11 below the individual blow stations 8 out of the clean room 20.

The transport unit 2 may include further elements which are provided above the clean room 20.

The carrier 26 is here fixedly provided on a holding body 29, and this holding body in turn is movable relative to the floor 13. In this respect, reference numeral 27 relates to a further sealing unit, which effects sealing of the areas 13 and 29 which are movable relative to each other also in this area.

Reference numeral 5 relates to a stretching rod that is movable relative to the blow station, in order to stretch the plastic preforms 10 in the longitudinal direction thereof. In this respect, a slide 12 is here provided on the cover 17, in relation to which slide the stretching rod is movable in the direction Y. Reference numeral 21 relates to a further mounting for this slide 12 of the stretching rod 5.

It can be seen that certain areas of the stretching rod are located both outside of the clean room 20 and inside of the clean room 20 during the blow process. To this end it is possible to provide protection means such as bellows outside of the clean room 20 or above the slide 12, which surround the stretching rod 5, so that no area of the stretching rod 5 will come into direct contact with the external surroundings. Reference sign U identifies the (non-sterile) surroundings of the clean room 20. Reference numeral 28 identifies a carrier for carrying a bottom mould, which also forms a component of the blow mould 4. This carrier is here also movable in the direction Y.

Reference numeral 55 relates to a sterilisation unit which is here preferably provided inside the clean room 20 and is used for sterilising the individual moulding stations or components of these moulding stations 8. This sterilisation unit 55 can here apply for example hydrogen peroxide or another sterilisation medium onto the moulding stations 8. The sterilisation unit 55 may be provided in a stationary manner and the moulding stations can move relative to this sterilisation unit 55. This sterilisation unit or application unit 55 may be located on the transport wheel 2 or on the standing wall 18 or may be provided generally in a stationary manner and may consist of nozzles or the like. Moreover it is advantageous to introduce sterile air for sterilising the clean room 20 via the ventilation system into the clean room 20.

The blow moulds or blow moulding units (not shown) are provided within the blow mould carriers 6. More specifically, two blow mould carrier parts may be provided here, which are pivotable relative to each other and each of which hold one blow mould part. As a result of this pivoting process, the blow moulds can be opened for introducing plastic preforms and for removing finish-blown containers. These blow mould carriers and blow moulds are here also provided within the clean room.

However, it would also (unlike what is shown in FIG. 2) be possible and preferred if the transport unit 2 or the carrier includes a C-shaped outer circumference, which also partially forms the external walls of the clean room. Thus, this C-shaped clean room wall rotates together with the transport unit 2, i.e. the blow wheel. In this embodiment, the lower boundary of the clean room is spaced apart from the floor 13 and moves relative to the floor. In this way, the clean room may be designed to be even smaller than shown in FIG. 2. A sealing of this C-shaped profile of the transport unit, which here forms both an internal wall and bottom and top covers of the clean room, preferably occurs here only in relation to the external wall of the clean room. This external wall is here advantageously provided in a stationary manner.

Reference numeral 14 identifies a highly schematic view of an application unit that applies blow air onto the plastic preforms. Here, this application unit may include a blow nozzle that can be presented to a mouth edge of the plastic preform and allows in this way blow air to be applied thereto in a sealed manner. Reference numeral 15 identifies a highly schematic view of a valve block that includes a plurality of valve units (not shown in FIG. 2), in order to control the supply of blow air to the plastic preforms. These valve units are here preferably implemented in the manner shown above. The valve units described here, however, are preferably also part of the application unit.

FIG. 3 shows a valve unit according to the invention. This valve unit has here a working piston 144 which is movable relative to a working space 142 and is here disposed so as to be displaceable in the direction of the double arrow P. As shown in FIG. 3, in one position this working piston can close the opening 146, so that a gaseous medium present in the working space or the working chamber 142 cannot pass through the opening 146 in the direction of a plastic preform (not shown). Reference numeral 164 identifies a supply opening, via which the working medium, in particular blow air, is supplied to the working space 142. In a second position (shown here in FIG. 3), the working piston 144, more specifically the front face 144*a* thereof, releases the opening 146, so that the blow medium can exit via this opening and can in this way expand the plastic preform.

Reference numeral 144*b* identifies a tapered area of the working piston, which is used, as will be explained in more detail below, to allow in a cleaning mode cleaning agent to flow from the working chamber 142 towards a control chamber 152. Below the working piston, three positions P1, P2 and P3 are shown, in which the openings are either closed or opened or in which cleaning is possible.

Reference numeral 148 identifies a cleaning unit that substantially prevents, at least in positions P1 and P2 of the working piston 142 as well as in the positions there between, a passage of the gaseous medium from the working chamber 142 towards the control chamber 152. Preferably, this sealing unit 148 is implemented as an aseptic sealing unit. In connection with this it is possible for the sealing unit 148 to be provided in the housing surrounding the piston, as shown in the figure. The housing could here include a reception recess for receiving the sealing unit 148. However, it would also be conceivable for the sealing unit 148 to be integrated into the piston itself. To this end, the piston could include a recess in which a section of the sealing unit is inserted. It would also be conceivable for a cleaning agent to be supplied to the sealing unit.

In the control chamber 152, a control piston 154 is provided, which is also displaceable in the direction of the double arrow P. By means of this control piston, the movement of the working piston at least to the left can be achieved here.

Further, a membrane body 158 is provided, which subdivides the control chamber 152 into a control space 152*a* and a further space 152*b*. Control air is applied to this control space 152*a* via an opening 168, which control air in turn effects the movement of the control piston 154 in the control chamber 152. The membrane body 158 is here at the same time a sterile space boundary S. In FIG. 3, a non-sterile medium, i.e. the control air, is provided to the right of this sterile space boundary or the membrane body 158. To the left of the membrane body, however, there is a sterile area.

Reference numeral 162 identifies an opening, via which for example a cleaning agent can be discharged during a cleaning operation, however in particular gaseous sterilisation medium during a sterilisation operation.

FIG. 4 shows a further highly schematic view of a valve unit according to the invention. The essential difference to the embodiment shown in FIG. 3 is here that the working piston 144 and the control piston 154 are formed in one piece. Here, too, the entire control piston 154 is provided in the non-sterile area. This non-sterile area is here sealed by the membrane body 158.

In this embodiment, the entire control piston 154/working piston 144 is therefore located in a sterile area, whilst in the situation shown in FIG. 3, the membrane body 158 seals the control piston or an area 154*a* of the control piston against the control space 152*b* (and seals another area 154*b* of the control piston 154 against the control space 152*a*), the membrane body seals, in the embodiments shown in the subsequent figures, the entire control piston against the control space 152*a*.

Thus, in the embodiment shown in FIG. 3, the control air acts directly on the control piston, whilst in the subsequent embodiments, the control air preferably acts via the membrane body 158 onto the control piston 154. However, also in the embodiment shown in FIG. 3, part of the control piston is disposed in the control space 152*b*, namely the area 154*b* that protrudes to the right beyond the sealing unit 148. This area still has to be associated with the control piston because it is still located in the control space. This area 154*b* can, beyond the membrane body 158, be in permanent connection with the area 154*a* of the control piston.

The valve proposed here is preferably also suitable for recycling blow air. In this respect, the valve cannot only be used to control the actual blow operation, but it would also be possible to allow, after the container has been finish blown, air from the container to flow via a valve according to the invention back into a ring space or a ring line.

Thus, within the context of the present application, what is understood under a control piston is in particular those sections which, during working operation, (substantially) move within the control space, and as a working piston those sections which move within the working chamber 142.

FIGS. 5*a* to 5*c* show a valve unit according to the invention in three different switching positions. In the position shown in FIG. 5*a*, the opening 146 is closed by the working piston 144 or the front face 144*a* thereof. In this position, no blow air gets to the plastic preform.

The control piston 154 or the control piston section is here in a bottom position. The membrane body 158 can here rest against a surface of the control piston 154, but this does not have to be the case. It can be seen that the control piston has a substantially greater cross-section than the working piston or the front face 142a thereof. In this way, it is also possible to place the valve in the closed position using comparatively low control air pressures, even if a high pressure of for example 40 bar is present in the working space 142.

In the situation shown in FIG. 5b, the valve 140 is in an open position, which means the opening 146 is released by the front face 144a. On the other hand, however, in this position too, a passage of the blow air in the direction of the control space or of the control chamber 152 is prevented. The control piston 154 preferably rests here against the membrane 158. The membrane in turn constitutes a sterile room boundary.

In the situation shown in FIG. 5c, the tapered area 144b of the working piston or of the unit of working piston and control piston is now located in the area of the sealing unit 148. In this situation, a cleaning agent can flow from the working space 142 to the control chamber 152. In the embodiment shown here, the taper 144b is formed to go all the way round, but this does not necessarily have to be the case. It would also be possible for a certain guiding effect to be retained, in which this taper is not formed to go all the way round.

In the embodiment shown in FIG. 5c, the membrane body 158 is loaded by the control piston 154.

Figure 6:
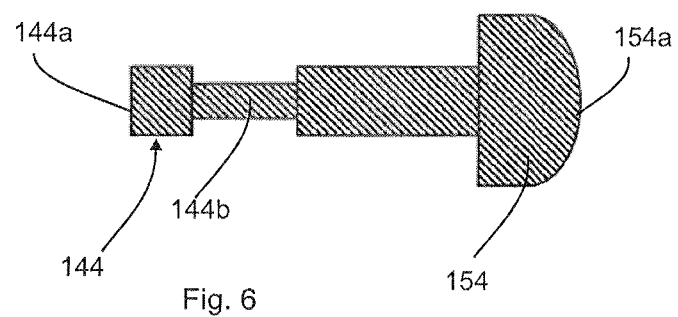
FIG. 6 shows a view of a combined working and control piston.

FIG. 6 shows a view of a working and control piston. Reference numeral 144 is here again directed to the section of the working piston, reference numeral 154 to the section of the control piston. It can be seen that the control piston 154 has here a curved front face 154a, which is here the face that contacts the membrane body (not shown). As a result of this curved surface, the membrane body, in particular during a cleaning operation of the valve, can be highly protected.

In the variants shown here, the valve may be in three positions, namely in a closed position, an open position and a cleaning position. However, it would also be possible that in the open position of the valve cleaning can take place at the same time, for example by providing for the tapered area of the valve to be already located in the area of the sealing unit. Apart from that a further valve, which is not shown in the figures, may be provided which can open and block a branching off of cleaning agent or of SIP agent. In a further advantageous embodiment, also a separate SIP line could lead into one or more of the shown spaces or chambers of the valve unit. The applicant reserves the right to claim all of the features disclosed in the application materials as being essential to the invention, provided they are novel over the prior art either individually or in combination.

LIST OF REFERENCE NUMERALS

1 Moulding apparatus
2 Transport wheel
5 Stretching rod
6 Blow mould carrier
8 Blow/moulding stations
9 Guide cam
10 Plastic preforms
10a Containers
11 Follower unit
12 Slide
13 Floor
14 Application unit
15 Valve block
17 Cover
18 Further wall
19 Lateral wall
20 Clean room
21 Mounting for slide
22 Supply unit
23 Holding unit
24 Discharge unit
25 Sealing unit
26 Carrier
27 Further sealing unit
28 Carrier for carrying a bottom mould
29 Holding body
30 Heating unit
31 Heating elements
32 Sterilisation unit
34 Transport unit
36 Transfer unit
37 Transport wheel
40 Bottling unit
42 Transfer unit
44 Transport unit
50 System for producing plastic containers
55 Sterilisation unit
140 Valve
142 Working space/Working chamber
144 Working piston
144b Tapered area
146 Opening
148 Sealing unit
152 Control chamber
152a, 152b Control spaces
154 Control piston
154a,b Areas of the control piston
158 Membrane body
162 Discharge opening
164 Supply opening
168 Opening
P Double arrow
P1-P3 Positions
S Sterile room boundary
L Clean room boundary
X Axis

The invention claimed is:

1. An apparatus for moulding plastic preforms into plastic containers, comprising at least one moulding unit that includes a blow mould unit forming a cavity, within which the plastic preforms can be moulded by applying a gaseous medium to the plastic containers, wherein the moulding unit includes an application unit that applies a gaseous medium to the plastic preforms via the mouth thereof, and wherein said application unit includes at least one valve unit for controlling the gaseous medium to be supplied to the plastic preform, and wherein the valve unit has a working chamber to which a gaseous medium can be applied, as well as an opening, via which the gaseous medium can be supplied from the working space to the plastic preforms and/or can be discharged therefrom, and wherein the valve unit has a working piston, which is movable within said working chamber between at least first and second positions, wherein in a first position of said working piston, the gaseous medium can flow via the opening, and wherein in a second position of the working piston opposite the working chamber, a flow of the gaseous medium through the opening is prevented, and wherein the valve unit has a control piston that is movable within a control chamber between at least two positions, wherein a movement of the control piston is coupled, at least at times, to a movement of the working piston, and wherein the control chamber has an opening for supplying and/or discharging a control medium, characterised in that the valve unit includes a sealing unit that substantially prevents a gas flow between the working chamber and the control chamber at least in one position of the working piston, and wherein the valve unit further includes a membrane body that seals at least one area of the control piston against at least one area of the control chamber, wherein the sealing unit is provided between the membrane body and at least one section of the working piston.

2. The apparatus as claimed in claim 1, wherein the membrane body is provided in the control chamber.

3. The apparatus as claimed in claim 1, wherein the membrane body delimits the control chamber and/or a control space.

4. The apparatus as claimed in claim 1, wherein the sealing unit substantially prevents a gas flow between the working chamber and the control chamber in the first and/or the second position of the working piston.

5. The apparatus as claimed in claim 1, wherein the working piston can be placed in a third position in relation to the working chamber and in this position, a media flow is enabled between the working chamber and the control chamber.

6. The apparatus as claimed in claim 1, wherein the valve unit includes a supply opening for supplying a cleaning agent.

7. The apparatus as claimed in claim 1, wherein the sealing unit surrounds a section of the working piston in a circumferential direction thereof.

8. The apparatus as claimed in claim 1, wherein the membrane body rests against a surface of the control piston.

9. The apparatus as claimed in claim 1, wherein at least two valve units are provided in or on a valve block which is provided on a moulding station.

10. A pneumatically controlled valve unit for controlling a media supply to a container, wherein the valve unit has a working chamber, to which a flowable medium can be applied, as well as an opening, via which the flowable medium can be supplied from the working chamber to the containers, and wherein the valve unit includes a working piston that is movable within the working chamber between at least first and second positions, wherein in a first position of the working piston opposite the working chamber, the flowable medium can flow via the opening, and wherein in a second position of the working piston opposite the working chamber, a flow of the flowable medium through the opening is prevented, and wherein the valve unit has a control piston that is movable within a control chamber between at least two positions, wherein a movement of the control piston is coupled, at least at times, to a movement of the working piston, and wherein the control chamber has an opening for supplying and/or discharging a gaseous control medium, wherein the valve unit includes a sealing unit which in the first and second positions of the working chamber substantially prevents a gas flow between the working chamber and the control chamber, and wherein the valve unit further includes a membrane body that seals at least one area of the control piston against at least one area of the control chamber, wherein the sealing unit is provided between the membrane body and at least one section of the working piston, and wherein the membrane body delimits a control space of the control chamber, to which the gaseous control medium is applied.

11. A method for moulding plastic preforms into plastic containers, wherein the plastic preforms are transported along a specified transport path and are moulded during this transport by applying a gaseous medium to the plastic containers, wherein a sterile gaseous medium is supplied to the plastic preforms and wherein the supply of the gaseous medium is controlled by at least one valve unit, wherein said valve unit is a valve unit that is controlled by a further gaseous medium and includes a working space, to which the gaseous medium can be applied, wherein the further gaseous medium is a non-sterile medium, and that this further gaseous medium can be applied to a control space for moving a control piston, wherein said control space is delimited by a flexible membrane.

12. The apparatus as claimed in claim 1, wherein at three valve units are provided in or on a valve block which is provided on a moulding station.

* * * * *